UNITED STATES PATENT OFFICE.

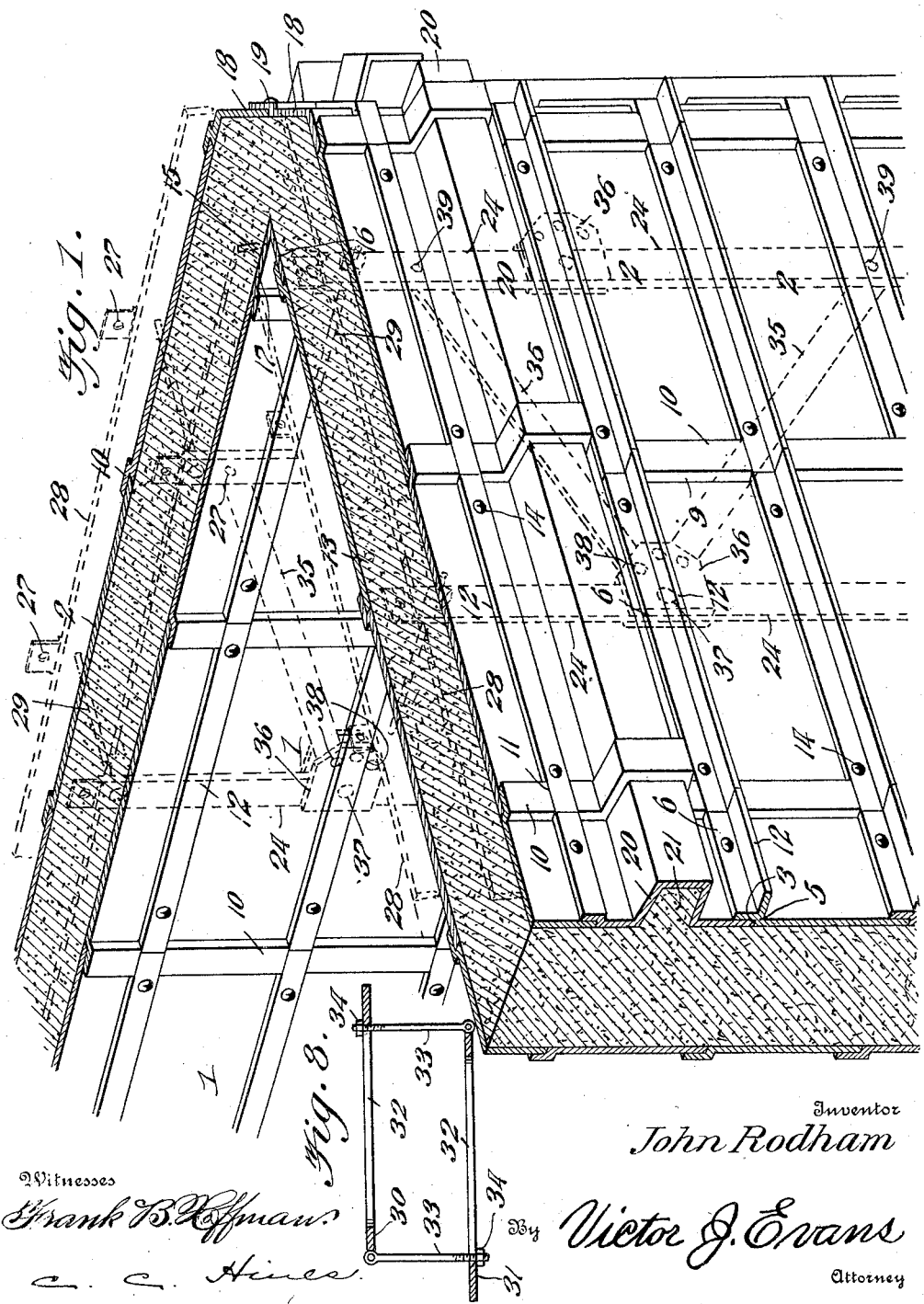

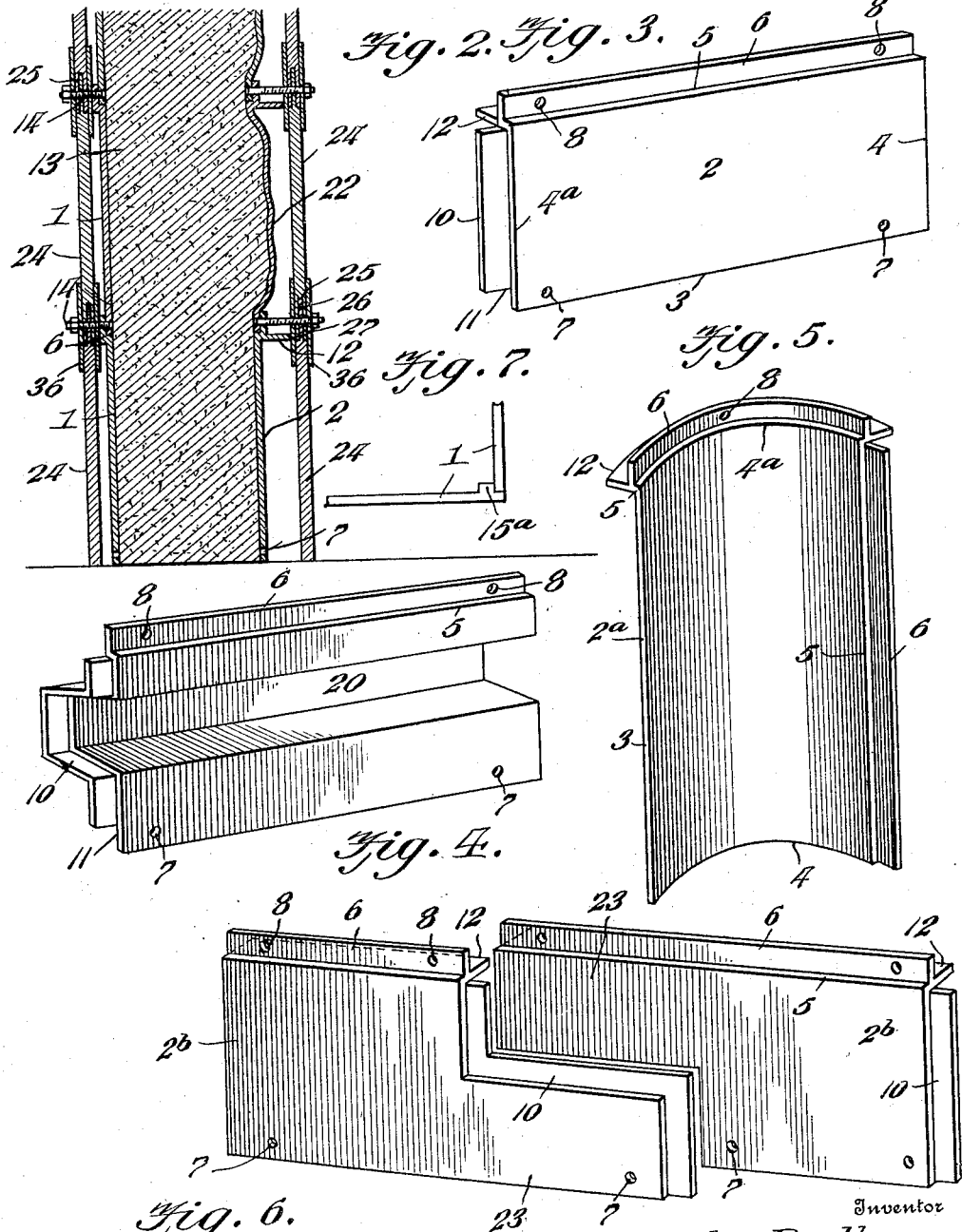

JOHN RODHAM, OF UNIONTOWN, PENNSYLVANIA.

MOLD.

967,836.

Specification of Letters Patent. Patented Aug. 16, 1910.

Application filed April 17, 1908. Serial No. 427,566.

*To all whom it may concern:*

Be it known that I, JOHN RODHAM, a citizen of the United States, residing at Uniontown, in the county of Fayette and State of Pennsylvania, have invented new and useful Improvements in Molds, of which the following is a specification.

This invention relates to molds for building walls or houses of artificial stone, as of cement, concrete or other plastic material, by molding the walls *in situ* or with all the parts formed thereon in the process of making the walls, the main object of the invention being to provide mold plates or members which may be conveniently assembled and disassembled, which are adapted to lap and be secured firmly together to form a strong and rigid mold, which are constructed to give any desired shape or appearance to different portions of the walls or form parts of the building usually made independent of the walls, such as sills, cornices, moldings, window casings, round, square or other suitable forms of corners, pillars and the like, and further to provide mold plates or sections for forming the foundation and different stories of the body of a building and which may be purchased at different times and used in conjunction for building a house part at a time, and which may also be repeatedly used in the construction of different walls or buildings.

With these and other objects in view, the invention consists of the features of construction, combination and arrangement of parts hereinafter fully described and claimed, reference being had to the accompanying drawings, in which:—

Figure 1 is a sectional perspective view showing the mold as set up for forming a wall, and also showing in dotted lines the bracing means which may be employed. Fig. 2 is a vertical cross-section through the formed wall and mold and showing plates for forming a rock faced front. Fig. 3 is a rear perspective view of one of the outer mold plates. Fig. 4 is a similar view of a mold plate for forming projections, ornamental or otherwise, upon the face of a wall. Fig. 5 is a perspective view of a mold plate or member for use in forming rounded surfaces, columns and the like. Fig. 6 is a view of mold plates constructed to break-joint. Fig. 7 is a plan view showing a modification in the plates for forming corners or angles. Fig. 8 is a view of an adjustable clamp for coupling the inner and outer vertical brace bars at their upper ends.

In the production of a mold constructed in accordance with the present invention, inner or outer sets of plates or mold members 1 and 2 are employed in conjunction with each other and suitable corner plates, as hereinafter described, to produce an intervening chamber or space in which the material is filled and tamped, so that, upon the removal of the mold sections after the material has set or hardened, a completely finished wall or entire body of a house will be formed.

The plates 1 and 2 are generally similar in construction, each being of rectangular or oblong rectangular form, either plain or patterned, as hereinafter described, to produce surfaces of different configurations. Each plate is provided with a plane longitudinal side edge 3 and a plane end edge 4, its opposite longitudinal side edge being formed with an outwardly extending right angular flange 5 forming a plane or square shoulder or abutting surface, and from the outer edge of said flange 5 extends a coupling flange 6 projecting at right angles to said flange 5 beyond said side edge of the plate and parallel with the body of the plate and with its inner face in alinement or substantially so with the outer face of said plate. The body of the plate is formed adjacent its edge 3 with openings 7 and the flange 6 is formed with similar openings 8, for a purpose hereinafter described.

As illustrated in the present instance the angular flanges 5 and 6 are formed at the upper longitudinal edges of the plates and extend the full length of the body portions of the plates, while at the opposite end of the plate from the edge 4 is formed an outwardly extending right angular flange 9, from the outer edge of which projects a coupling or retaining flange 10 extending beyond said end of the plate and parallel with the body of the plate and with its inner face in alinement or substantially so with the outer face of said plate, such end of the plate forming a plane or straight abutting shoulder 4ª. The flanges 9 and 10 terminate at their upper ends in line with the shoulder 5 and at their lower ends above the edge 3 of the plate, thus forming a cut away space or recess 11, which, as hereinafter stated, is designed to permit a close coupling of the plates of the molds together.

As thus far described, the plates 1 and 2 are alike in construction, but if desired, each outer plate 2 may be provided with an outwardly extending longitudinal bracing rib 12 projecting from the base of the flange 6 at its point of junction with the flange 5, said rib serving to strengthen the mold plate adjacent its point of connection with adjacent plates and to also serve as an abutment against which auxiliary bracing means of any preferred kind may bear to assist in supporting the outer wall of the mold without bearing directly upon the body portion of either plate. By this means an auxiliary bracing device of any kind may be employed and engaged with a plate patterned to impart an ornamental finish to the material without liability of pressing the plate unduly so as to impair the finished surface produced.

By reference to Figs. 1 and 2, it will be apparent that in the operation of forming the building or walls the two sets of plates 1 and 2 are set up vertically in longitudinal rows or courses so as to provide an intervening chamber in which the material 13 to form the completed wall is introduced and tamped and then allowed to set or harden before the mold plates are disassembled. In erecting each wall or side of the mold the plane lower longitudinal side edge 3 of each mold plate is arranged to rest against the plane shoulder 5 at the upper longitudinal edge of the underlying mold plate, with the flange 6 of the latter projecting over upon or overlapping the lower edge of the upper plate, while the plane end 4 bears against the plane shoulder $4^a$ of one of the adjacent plates and is overlapped by the flange 10 of said plate, while the flange 10 of the particular plate in question laps over upon the plane end of the next adjacent plate at the opposite side thereof, such interlapping of the plates at their vertical and longitudinal edges permitting the plates to fit snugly together to form a wall without breaks and which is stanch and rigid in construction.

When the mold plates of either wall are combined and arranged in the manner described, it will be observed that by reason of the formation of the spaces or notches 11 immediately below the lower end of each vertical lapping flange 10, provision is made for the reception in such spaces of the several mold plates of the adjacent ends of the longitudinal lapping flanges 6 of the adjacent plates, thus adapting the ends of such longitudinal flanges of the mold plates of each course to abut squarely against each other, thus increasing the strength of the mold wall at the joints.

The plates of each wall may be connected by the tie-bolts 14, which extend through the openings 7 in the lower edges of the plates 1 and 2 of each course and through the openings 8 in the flanges 6 of the plates of the next adjacent lower course, thus tying the plates of the walls firmly together and yet in such manner as to admit of their ready disconnection and removal after the formed material has set and hardened, and, if desired, the two walls may be connected and maintained in spaced relation by elongated bolts of this character, but it is preferred to couple the plates of each wall together and support and maintain the walls in position by the use of bracing means, as hereinafter fully described. In the formation of corners or other angular portions plates of special construction are used. As shown in Fig. 1, right angular inner corner plates 15 are employed for forming right angular inner corners, each of such plates having its webs or right angular portions 16 and 17 formed with the plane edges and side and end flanges similar to the plates 1 and 2. Outer corner plates 18, of substantially L-form, are employed for use in conjunction with the plates 2, and are constructed and connected therewith by the use of plane abutting surfaces and flanges of an analogous type, and it will be understood that these plates may vary in shape and contour according to the shape and configuration of the outer surface of the corner which it is desired to produce. Bolts 19 may connect the meeting edges of these plates 18 with each other and with the angle of the coacting inner corner plate 15. A number of these angular corner plates 18 may also be used in forming angular columns, etc., the number varying according to the sizes of the plates and diameter of the column.

Of course, it will be understood that any one of the individual outer or inner mold plates may be patterned or shaped to produce any desired interior or exterior finish upon the formed wall. In Fig. 1 I have shown the plates 2 of one of the courses provided with outwardly offset channeled portions 20 to form an ornamental rib, molding, cornice or other suitable projecting portion 21 upon the wall, while in Fig. 2 I have shown certain of the outer plates provided with an irregularly indented or outwardly pressed body portion 22 to form a "rock-face" finish upon the outer surface of the material.

The plates may be formed or constructed otherwise than hereinbefore mentioned to produce sills, cornices, moldings, window casings and other portions of a building usually made independent of the wall, or to finish the interior and exterior surfaces in any preferred or desired manner.

In Fig. 5, the mold plate or member $2^a$ is in the form of a partially circular plate having the other features of construction similar to the plates 2 hereinbefore described, such plate or member being designed for use in connection with one or more like plates or members for the production of pillars, columns or the like, while in Fig. 6 I have shown a pair of oblong plates $2^b$, the adjacent ends of which are "halved" or provided with reduced ends 23 to overlap and break joint when fitted together, this construction being preferred in the formation of mold walls in the production of certain types of buildings. The features of construction of these mold plates correspond in other particulars with the plates 2, which, it will be noted, differ from the plates 1 only in the provision of the bracing ribs 12, which may or may not be employed as desired. The mold plates throughout are as far as possible equivalents in construction so as to avoid complexity and difficulties in setting up the mold walls from the confusion liable to result when a variety of plates of different forms and sizes and varying materially in construction are used.

Reference has hereinbefore been made to a bracing means for holding the plates of the inner and outer walls in proper relation. In Fig. 1 I have shown in dotted lines a preferred type of bracing means which may be employed, certain elements of which are shown in section in Fig. 2, while in Fig. 8 I have shown an adjustable clamp which is used under some conditions of service. The bracing means consists of brace bars 24 which are, in practice, arranged vertically on the outer sides of the plates forming the walls of the mold. As shown, the iner set of brace bars and their couplings, hereinafter described, rest against the flanges 6 of the inner plates, while the outer set of brace bars and their couplings rest against the flanges 12. The bars are formed of sections of any desired length, each having at one end a socket or recess 25 and at its opposite end a tongue 26, thus allowing the adjacent ends of the sections to be fitted together, the interfitting ends of the bars being perforated, as at 27, for the passage of securing bolts. The lower ends of the lower bar sections may, of course, be plain, or without either tongue or recess, and they may be embedded in the ground or fixed in position in any suitable manner. The bars are arranged so that the upper ends of their upper sections project above the upper edges of the walls, and such upper ends may be tied or coupled together in any desired way.

In Fig. 1 I have shown the use of inner and outer horizontal connecting bars 28, coupled to the projecting upper ends of the vertical brace bars by bolts 29. In lieu of such coupling means, I may employ the adjustable coupling device shown in Fig. 8, said device comprising parallel bars 30 and 31 each having a longitudinal slot 32 and a pivoted bolt 33 provided with a clamping nut 34. The bolts are located at the diagonally opposite ends of the device and the free end of the bolt of each bar passes through the longitudinal slot of the other bar. This device forms an open rectangular frame which is adapted to be fitted over the projecting upper ends of adjacent opposed spaced pairs of the inner and outer braces and to hold the same rigidly from outward movement. It will be apparent that the frame is rendered adjustable by the sliding fit of the bolts in the slots to adjust the same to connect inner and outer braces spaced different distances apart.

Diagonal stay bars 35 may be used to connect the adjacent outer or inner vertical brace bars in pairs, and, when these are employed, the sections of each bar are preferably united by a hexagonal coupling block or member 36 recessed to receive the alined brace bar sections and the divergently arranged stay-bars, said bars being secured thereto by bolts 37 and 38. If desired, however, an elongated bolt 14 may be used to couple the plates, brace bar sections, block and stays when the block is disposed in alinement with a bolting point in the plates, as shown in Fig. 2. The inner or converging ends will thus be connected with one vertical brace and the outer or diverging ends thereof may be bolted to an adjacent vertical brace, as at 39, and all the braces may be connected in this manner, so that the bracing frames on the inner and outer sides will firmly support both sets of wall plates. The braces may be extended and stayed in an obvious manner as the wall is built up, thus maintaining the outer and inner plates in accurate parallelism. By the provision of the flanges 12 against which the outer braces bear, direct pressure upon the body of any plate is prevented, hence plates patterned to produce ornamental finishes may be used without liability of impairment of the surface of the wall, such as would likely be caused under excess pressure.

Having thus fully described the invention, what is claimed as new is:—

1. In a molding apparatus, the combination of inner and outer walls, each formed of superposed horizontal tiers of mold plates, the mold plates of the inner and outer walls being provided with abutting shoulders to bear upon each other, and each mold plate having at one side and one end a flange to lap upon the outer faces of the adjacent plates, the vertical lap flanges of the plates being shortened to provide for the reception of the horizontal lap flanges of the adjacent plates, the horizontal lap flanges of the outer plates being provided with bracing ribs extending outwardly at right angles therefrom, and bolts extending through the horizontal lap ribs of each plate and through the adjacent abutting portions of the other plates and uniting the tiers of plates.

2. In a wall molding device, inner and outer mold walls formed of assembled plates, vertical brace bars to bear against the outer sides of the plates of said walls, each of said brace bars being formed of sections, the adjacent ends of the sections of each brace bar having a tongue and groove connection, means for coupling and sustaining the brace bars bearing on the respective walls, said means comprising pairs of upper and lower diagonal brace bars connected at one end with the sections of one of the vertical brace bars, a hexagonal coupling block having a vertical recess to receive the ends of adjacent vertical brace bar sections and converging recesses to receive the ends of the diagonal brace bars, bolts independently coupling the block to said bars, and means for connecting the upper ends of the inner and outer sets of vertical brace bars.

3. In a molding apparatus, the combination of inner and outer walls, each comprising superposed horizontal tiers of mold plates, the mold plates of the inner and outer walls being provided with abutting shoulders to bear upon each other, and each mold plate having at one side and at one end a flange to lap upon the outer faces of the adjacent plates, the vertical lap flanges of the plates being shortened for the reception of the horizontal lap flanges of the adjacent plates, the horizontal lap flanges of the outer plates being provided with bracing ribs extending outwardly at right angles therefrom, bolts extending through the horizontal lap ribs of each plate and the adjacent abutting portions on the other plates and uniting the tiers of plates, sets of brace bars arranged against the outer sides of said walls, the brace bars associated with the outer wall being arranged to bear against said bracing ribs, means coupling the bars of each set, and means coupling the sets of bars above the walls.

In testimony whereof I affix my signature in presence of two witnesses.

JOHN RODHAM.

Witnesses:
GUILFORD H. KEIRSTED, Jr.,
DAVID M. HERTZOG.